May 27, 1969  E. D. WILKERSON  3,445,936
VEHICLE WHEEL ALIGNMENT TESTING APPARATUS AND METHOD
Filed April 30, 1965

INVENTOR
EDWARD D. WILKERSON

BY
*Nissen, Porter, Noller & Brown*
ATTORNEYS

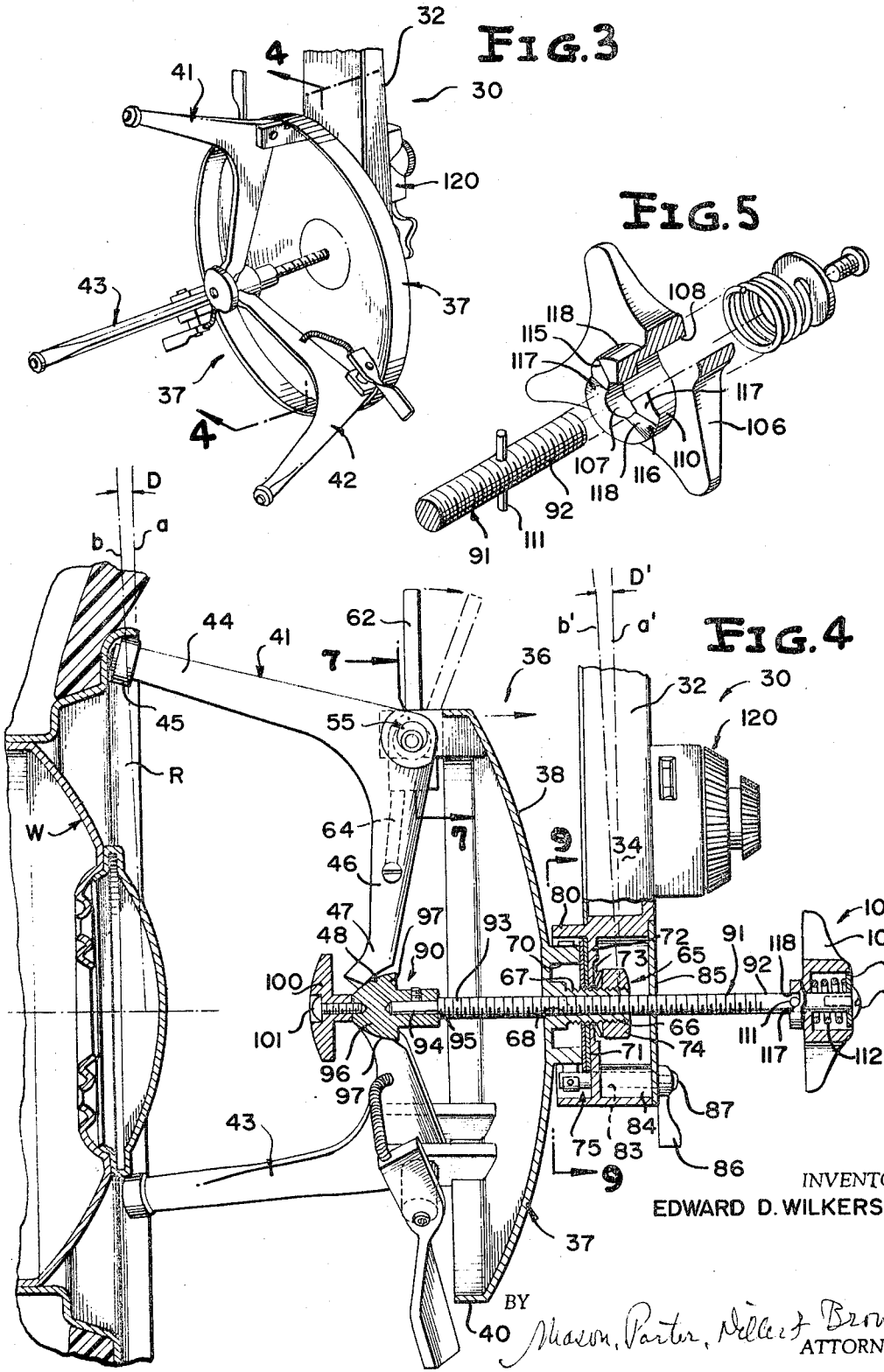

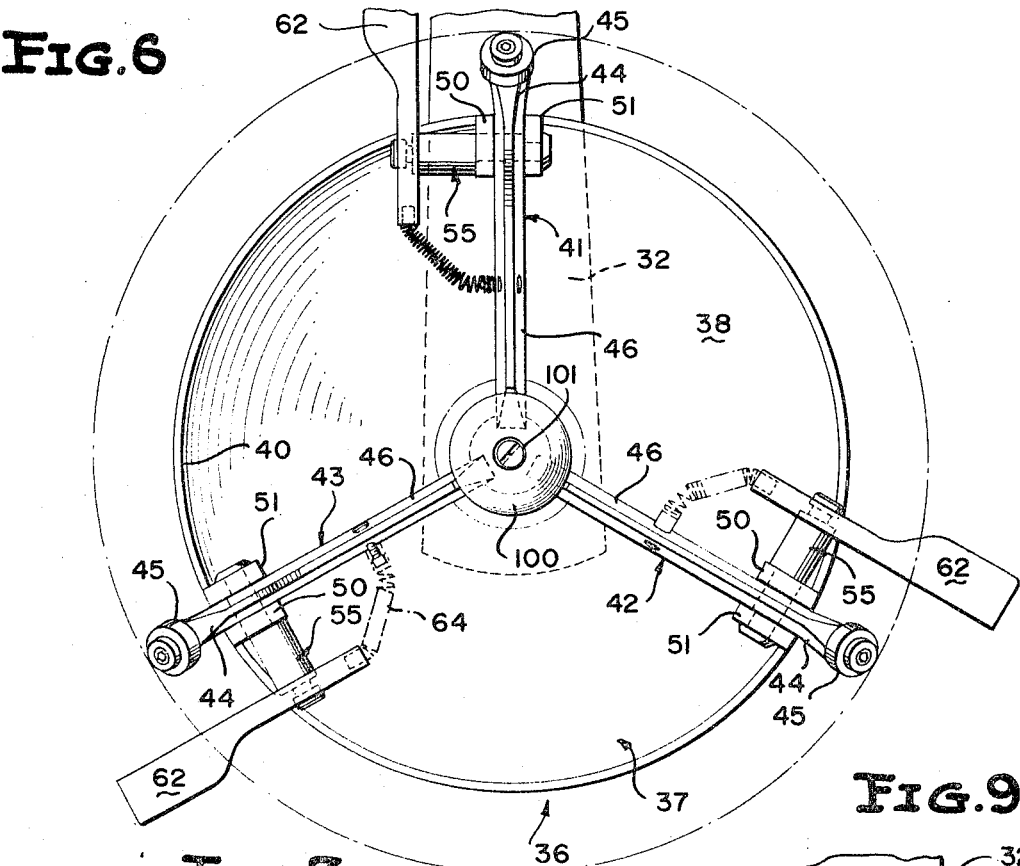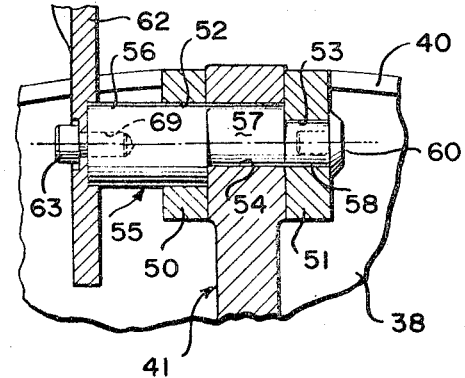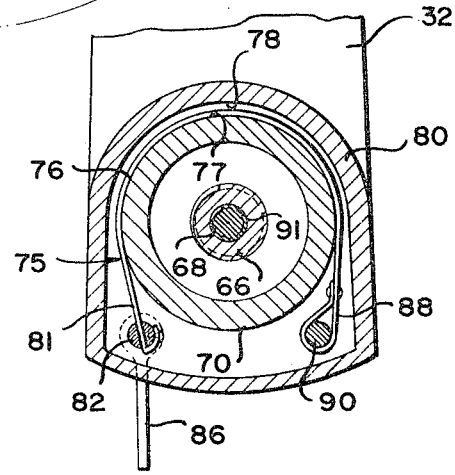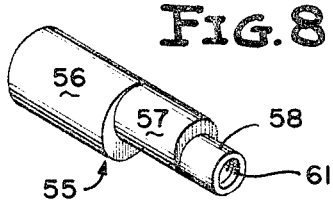

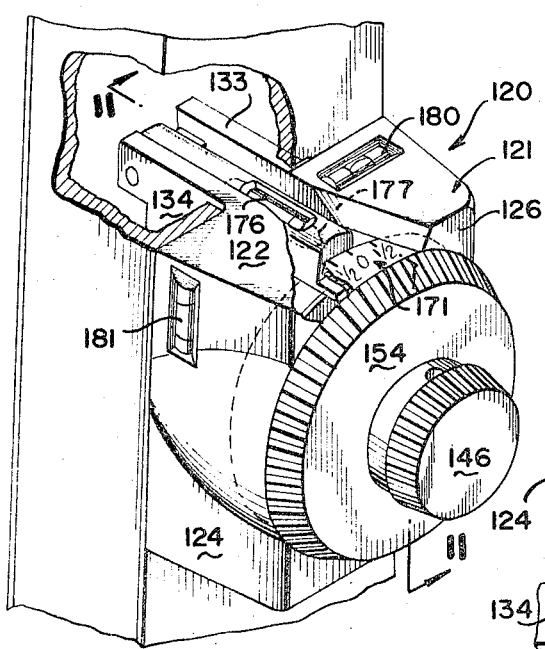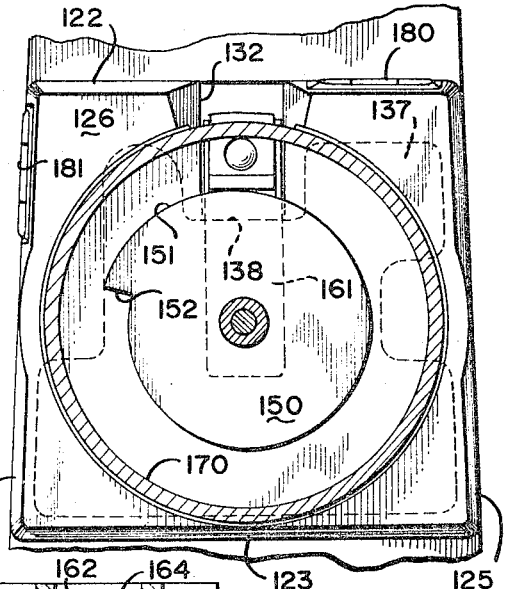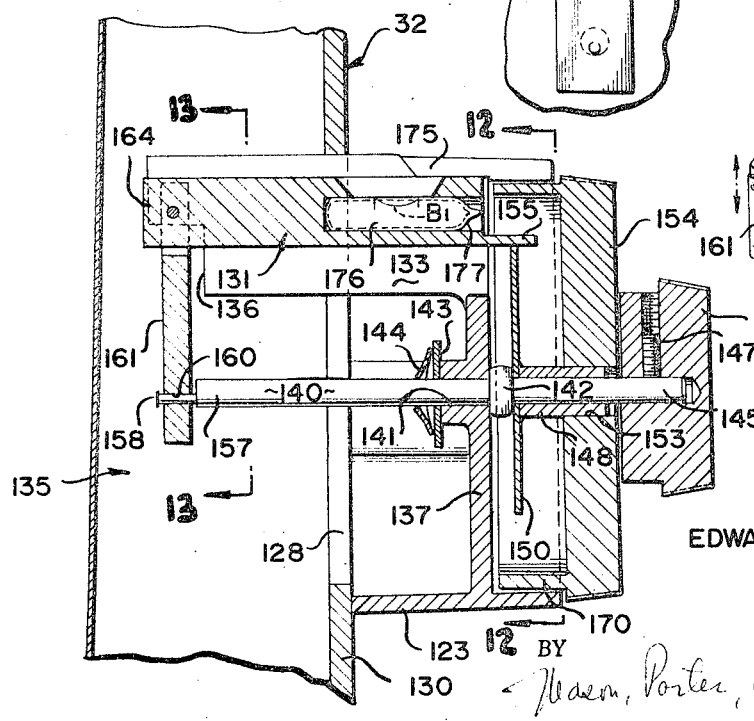

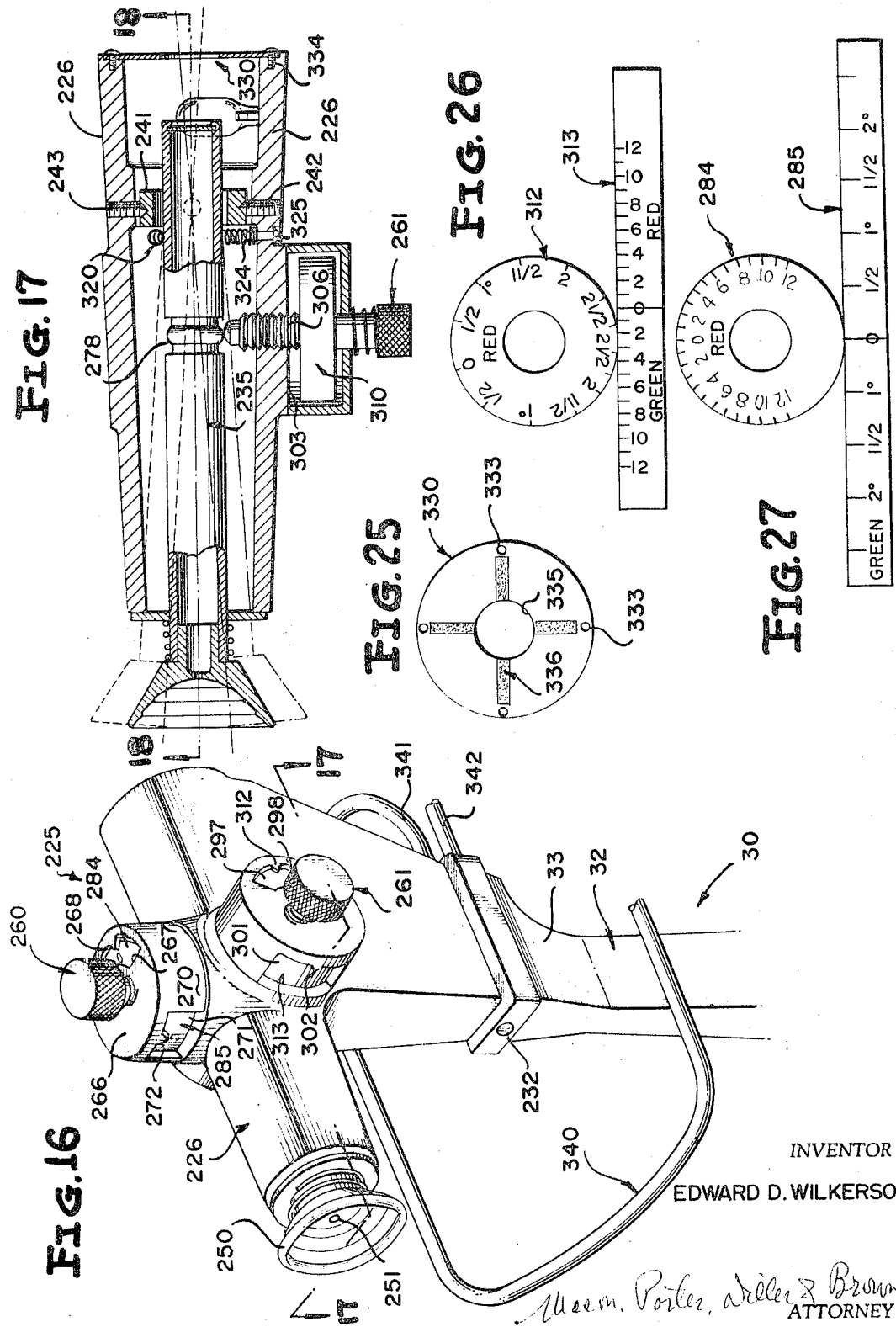

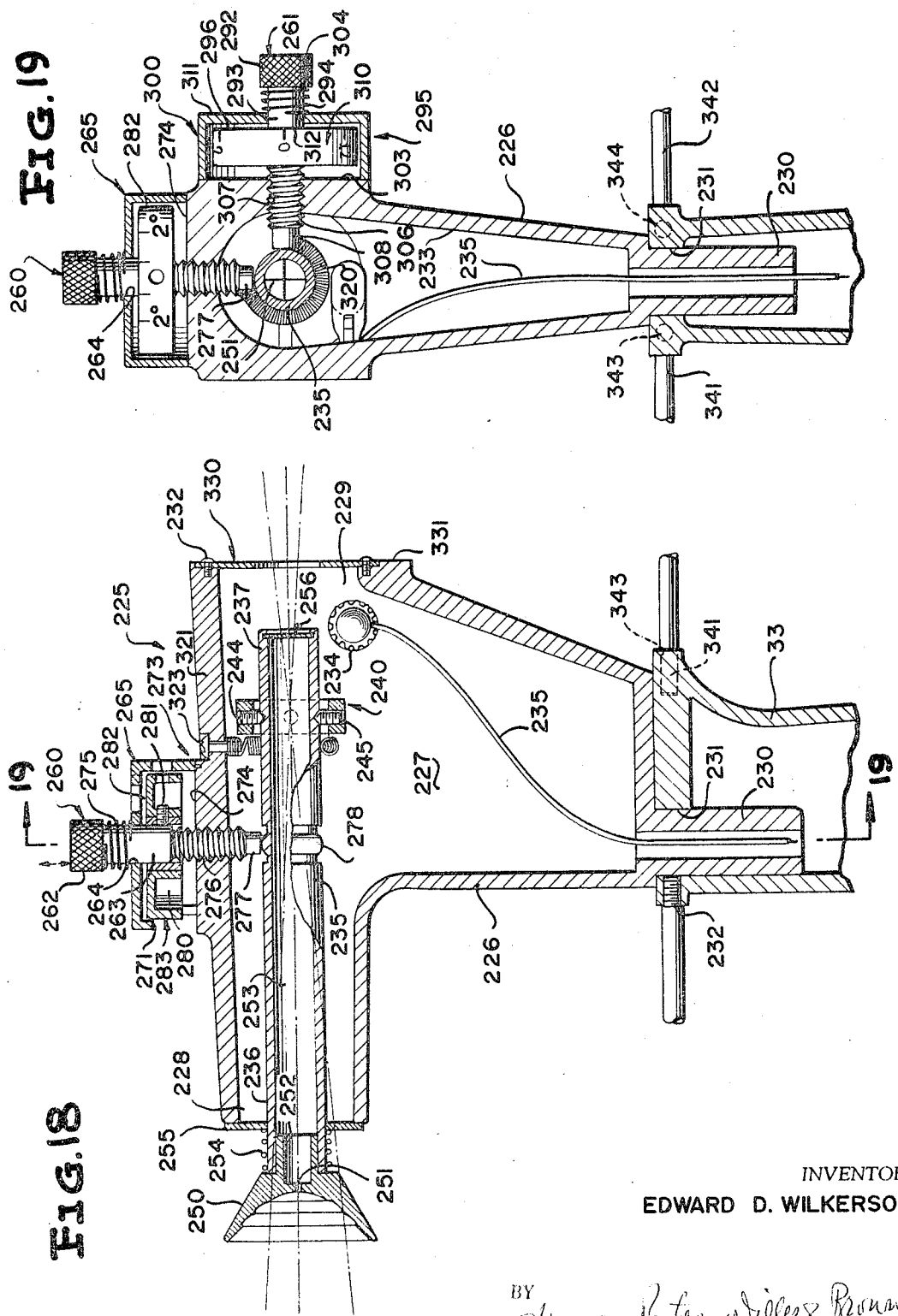

INVENTOR
EDWARD D. WILKERSON

United States Patent Office 3,445,936
Patented May 27, 1969

3,445,936
VEHICLE WHEEL ALIGNMENT TESTING
APPARATUS AND METHOD
Edward D. Wilkerson, 280 E. North Field Road,
Livingston, N.J. 07039
Filed Apr. 30, 1965, Ser. No. 452,048
Int. Cl. G01c 15/00; G01b 5/255
U.S. Cl. 33—46                                32 Claims

ABSTRACT OF THE DISCLOSURE

This invention relates to a novel vehicle wheel testing apparatus, and in particular, to a novel wheel aligner by means of which the camber, caster, toe in, steering geometry and general alignment of the wheels of a vehicle may be readily and easily determined. The testing apparatus includes a pair of identical posts each of which carries a viewing head for determining camber and toe-in when the posts are in either vertical or horizontal planes, as well as a device for determining caster. Each sight head includes a sight tube movable by screws in vertical and horizontal planes with each screw carrying indicia means for indicating camber and toe-in dependent upon sight tube movement when the support posts are disposed either vertically or horizontally.

---

It is well known that the wheels of modern automobiles are positioned in accordance with certain standards, as to the factors above-mentioned, as adapted for the most efficient road performance. All such factors are important and so inter-related that when one of the factors is inaccurate the other factors are effected thereby, and sometimes a slight variation in one of the factors results in magnified inaccuracy in one or more of the other factors.

Conventional devices have heretofore been devised for testing vehicle wheels to determine such factors, but these devices generally required separate elements or attachments for making the different tests or relied upon extraneous fixed structures, such as vertical posts or walls, during the test. Such testing is not always reliable or satisfactory as several elements may unknowingly be present to intrefere with the accuracy of these tests, such as a support that is not perfectly level or unevenly inflated or worn tires.

Such conventional testing devices also fail to provide any means for compensating for factors built in to vehicle front ends or the wheels thereof, such as "runout" tolerance i.e., the wobble of a wheel when rotated. Without compensating for such "run-out" tolerance conventional wheel alignment devices provide results which are automatically erroneous to a greater or lesser extent depending upon the particular wobble in the wheels tested.

It is also common to provide wheel alignment devices of the type which generally include inter-changeable sighting and target devices with the target devices generally including indicia which indicates the particular angular relationship between two lines of sight taken from opposite sides of a vehicle during a usual testing operation. Such devices also automatically include inaccuracies in the test results obtained. For example, in conventional aligning devices, a target having indicia is supported on one vehicle wheel and a sight head mounted on another opposite vehicle wheel is used to view the target surface. The indicia on the target indicates the relative angle between the vehicle wheels when viewed through the sight head. However, the angle read off the target will vary depending upon the distance between the sight head and the target. Thus, when testing the alignment of "midget" narrow tread vehicles, the sight head and target are closer to each other and erroneous results are read off the target. Such erroneous results are eliminated by the novel wheel aligning device of this invention by providing a target which has no indicia except for a cross-hair and a sight head which includes a sight tube movable in a vertical and horizontal plane. The sight head is provided with gauges for determining the amount of movement between a first position offset from the cross-hair of the target and a second position at the cross-hair. In this manner the aligning device can be used to test both narrow and wide tread vehicles without the introduction of errors because of the particular tread width of the tires of the vehicle being tested.

It is, therefore, a primary object of this invention to provide a novel wheel aligner which includes a pair of posts for mounting on opposite automobile wheels, each post includes both a sight head and a target, each sight head having viewing means through which an opposite target is viewed along a predetermined line of sight, there being provided first and second means for moving the viewing means in vertical and horizontal planes, and means associated with each of the moving means for determining the amount of movement of the moving means in each of the planes relative to the viewed target to directly indicate the angular relationship between the automobile wheels.

A further object of this invention is to provide a novel wheel aligner including a support post having upper and lower end portions, means at the lower end portion for securing the wheel aligner to an automobile wheel rim, viewing means at the upper end, first and second means for moving the viewing means in horizontal and vertical planes respectively, means associated with each of the first and second moving means for determining the amount of movement of the first and second moving means in each of the planes relative to a target viewed through the viewing means along a line of sight, and means at the lower end portion of the post for compensating for wheel rim run-out by providing relative adjustment of the support post relative to the automobile wheel rim whereby the support post is maintained in a plane normal to the line of sight for preventing incorrect determination by the determining means.

Still another object of this invention is to provide a novel wheel aligner of the type immediately above-described in which the support post is securable in both a vertical and horizontal plane and the moving and determining means are also operative in both a vertical and horizontal position on the post whereby an automobile can be tested over-the-hood or across-the-front.

Another object of this invention is to provide novel wheel aligner of the type described above including a caster gauge comprising a housing, a level, means mounting the level relative to the housing for movement of the level in a vertical plane, the level having a liquid chamber disposed in a generally horizontal plane, first and second actuating means for moving the level in a vertical plane, the first and second actuating means including first and second adjusting means between the first and second actuating means and the level for adjustably moving the level, the level having opposite first and second end portions, the first adjusting means being coupled to the first end portion for adjustably moving the first end portion in a vertical plane, the second adjusting means being coupled to the second end portion for adjustably moving the second end portion in a vertical plane, and means cooperative between the level and at least one of the actuating means for indicating the amount of movement of the level from true horizontal and thus indicating the amount of caster of an automobile wheel under test.

Another object of this invention is to provide a novel wheel aligner of the type immediately above described in which the level of the caster gauge includes a liquid chamber, the liquid chamber terminating in a generally tapered chamber portion defining indicator means, indicia means on one of the actuating means, and the indicator means being directed toward the indicia means whereby the amount of movement of the level by the actuating means is indicated by the portion of the indicia means opposite the indicator means.

Still another object of this invention is to provide a novel wheel aligner sight head including a housing, a sight tube mounted in a chamber of the housing for movement in two planes offset ninety degrees from each other, first and second means for moving the sight tube in each of the planes, the first and second means including respective first and second indicia means, first and second indicating means associated with the first and second indicia means respectively for indicating the movement of the sight tube in each of the planes relative to a view target, the sight head being operative in two planes offset ninety degrees from each other, and cooperative indicia and indicating means being operative to indicate the movement of the sight tube in each of the planes of the sight head.

A further object of this invention is to provide a novel wheel aligner of the type particularly adapted for securement to the wheel of an automobile, the device including a body, a plurality of securing arms pivotally mounted to the body for movement of ends thereof radially inwardly and outwardly relative to an axis of the body, and means for securing the arms in any one of the positions thereof, the improvement comprising movable eccentric means between the securing arms and the body for increasing and decreasing the distance between the ends of the securing arms and the body axis thereby compensating for run-out tolerance of a wheel to which the device is secured, the eccentric means including a member associated with each of the securing arms, each member having an eccentric portion, means rotatably mounting the member to said body, means mounting each securing arm upon the eccentric portion of an associated member, a handle carried by each member, and spring means between each handle and associated securing arm for establishing biasing forces between the handles and the securing arms to normally urge the securing arms in a predetermined direction.

A further object of this invention is to provide a novel wheel aligner of the type immediately above described including a shaft mounted by screw means for movement axially of the body, shaft including a handle, first means positively connecting the handle to the shaft upon rotation of the handle in a first direction and second means for disconnecting the connection of the first means at a predetermined clamping force between the ends of the securing arm and a wheel to which the device is secured to eliminate stresses and distortions which might otherwise be created upon over tightening of the securing arms to a vehicle wheel.

A further object of this invention is to provide a novel method of determining the relative position of a pair of wheels by means of a sight tube and target device carried by each of the wheels including the steps of sighting through a first of the sight tubes along a first line of sight at an opposite target, manipulating the first sight tube until the first line of sight indicates a zero setting on the opposite target, sighting through a second of the sight tubes along a second line of sight at another opposite target, manipulating the second sight tube until the second line of sight indicates a zero setting on the other opposite target, and determining the angular relationship between the first and second sight lines by the amount of manipulation required to bring the second line of sight to zero setting.

With the above, and other objects in view that will hereinafter appear, the nature of the invention will be more clearly understood by reference to the following detailed description, the appended claims and the several views illustrated in the accompanying drawings:

In the drawings:

FIGURE 3 is a fragmentary perspective view of a clamping or securing device for clamping the wheel aligner to an automobile wheel, and illustrates three securing arms and an eccentric associated with each of the securing arms for compensating for run-out tolerance of a vehicle wheel.

FIGURE 4 is an enlarged fragmentary sectional view taken generally along line 4—4 of FIGURE 3, and illustrates the securing device clamped to a rim of an automobile wheel, a locking device for securing a supporting post to the securing device in any one of a plurality of selected positions thereof, and a threaded shaft carrying a handle for actuating the securing arms.

FIGURE 5 is an enlarged fragmentary exploded view of the handle carried by the shaft of FIGURE 4, and illustrates a pin carried by the shaft and a groove in the handle for preventing overtightening the the securing arms beyond a predetermined desired tightening thereof.

FIGURE 6 is an elevational view of the securing device of FIGURES 3 and 4, and more clearly illustrates the securing arms and the associated eccentric members.

FIGURE 7 is an enlarged sectional view taken generally along line 7—7 of FIGURE 4 and clearly illustrates the mounting of one of the eccentric members between the associated securing arm and the body of the securing device.

FIGURE 8 is a perspective view of the eccentric member of FIGURE 7, and illustrates a pair of adjacent eccentric portions thereof.

FIGURE 9 is a fragmentary enlarged sectional view taken generally along line 9—9 of FIGURE 4, and more clearly illustrates the locking mechanism for securing the vertical post to the securing device.

FIGURE 10 is an enlarged fragmentary perspective view with parts broken away for clarity of a caster gauge carried by the supporting post, and illustrates a level and a pair of rotatable dials for moving the level in a vertical plane.

FIGURE 11 is an enlarged fragmentary sectional view taken generally along line 11—11 of FIGURE 10, and illustrates one of the dials coupled to one end of the level for moving the same in a vertical plane and another of the dials coupled to an opposite end of the level for similarly moving the level in a vertical plane.

FIGURE 12 is a sectional view taken generally along line 12—12 of FIGURE 11 and illustrates a cam surface of a cam contacting an end portion of the level for moving the same vertically.

FIGURE 13 is a fragmentary sectional view taken generally along line 13—13 of FIGURE 11, and illustrates an eccentric connected to a bracket which is in turn connected to the level for imparting movement thereto.

FIGURE 14 is a highly schematic view of the level, and illustrates the movement imparted thereto by the cam upon the rotation thereof by an associated dial.

FIGURE 15 is a highly schematic view of the level, and similarly illustrates the vertical movement imparted thereto upon the rotation of the other of the dials.

FIGURE 16 is an enlarged perspective view of a novel sight head of the wheel aligner of the invention, and illustrates a sight tube and a pair of screws carrying indicating dials for indicating the amount of movement of the sight tube upon rotation of the screws.

FIGURE 17 is an enlarged sectional view taken generally along line 17—17 of FIGURE 16, and illustrates a gimbal mounting of the sight tube and one of the screws contacting the sight tube for movement thereof in a horizontal plane.

FIGURE 18 is a sectional view taken generally along line 18—18 of FIGURE 17, and illustrates the cooperation between the other of the screws for moving the sight head in a vertical plane.

FIGURE 19 is a sectional view taken generally along line 19—19 of FIGURE 18, and illustrates a spring partially surrounding the sight tube for biasing the sight tube against the inward movement of the pair of screws.

FIGURE 25 is an elevational view of a target carried by the wheel aligner sight head, and illustrates a cross hair mark and a central opening thereof.

FIGURE 26 is an elevational view of indicia carried by one of the indicating dials of the sight head.

FIGURE 27 is an elevational view of indicia carried by the other of the pair of dials of the wheel aligner sight head.

Figure 1:
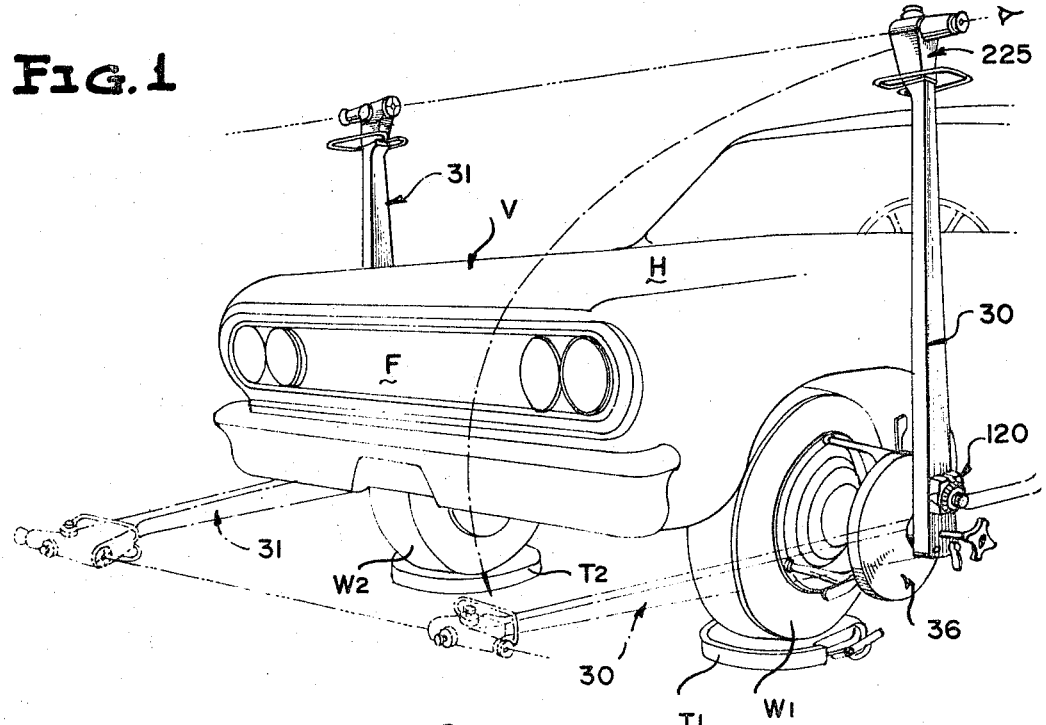
FIGURE 1 is a front perspective view illustrating two identical vehicle wheel alignment devices or wheel aligners of this invention, and illustrates two positions of the wheel aligners for testing front end alignment of the vehicle by sighting across the hood or by sighting across the front of the vehicle.

A pair of novel wheel aligning devices or wheel aligners are shown best in FIGURE 1 of the drawings, and are indicated by the reference numerals 30 and 31 respectively. The wheel aligners 30, 31 are identical and the following description of the wheel aligner 30 will be sufficient for a complete understanding of this invention.

The wheel aligner 30 comprises a supporting post 32 having a first upper end portion 33 and a second lower end portion 34. A sight head, generally referred to by the reference numeral 225 is secured to the upper end portion 33 of the post 32 in a manner to be described more fully hereinafter.

A securing device or clamping device 36 for mounting the wheel aligner 30 upon a vehicle wheel rim is secured to the lower end portion 34 of the post 32. The securing device 36 comprises a body 37 (FIGURES 3 and 4) having an outwardly convex wall 38 and a peripheral skirt 40 (FIGURES 4 and 6). Three generally L-shaped securing arms 41–43 are carried by the body 37 of the securing device 36. Each of the arms 41–43 includes identical first end portions 44 carrying caps 45 of rubber or similar nonabrasive material having a relatively high coefficient of friction for gripping a rim R (FIGURE 4) of a vehicle wheel W. Opposite end portions 46 of each of the securing arms 41–43 terminate at ends 47 having associated cam surfaces 48. As the ends 47 of the arms 41–43 are moved toward the wheel W (FIGURE 4) by means to be described hereinafter, the first end portions 44 of the arms 41–43 are moved radially outwardly with respect to the axis of the body 37 while movement of the ends 47 toward the wall 38 of the body 37 causes radial inward movement of the respective arms 41–43.

Each of the arms 41–43 are eccentrically and pivotally mounted to the peripheral skirt 40 of the body 37 of the securing device 36 by a pair of identical brackets 70 50, 51 (FIGURES 6 and 7). The brackets 50, 51 are secured to the peripheral skirt 40 of the body 37 by welding or similar securing means. Each bracket 50 has a circular opening 52 larger than and concentric with a circular opening 53 in an associated one of the brackets 51. Each of the legs 41–43 is provided with an identical circular opening 54 at the juncture of the first and second portions 44, 46. A member 55 (FIGURES 7 and 8) having portions 56, 58 and an eccentric portion 57 secures each of the securing arms 41–43 between adjacent brackets 50, 51 in the manner clearly illustrated in FIGURE 7 with respect to the securing arm 41. In FIGURE 7 of the drawings, the member 55 is inserted from left-to-right into the openings 52, 54 and 53 after the securing arm 41 is first positioned between the brackets 50, 51. The portions 56, 57 and 58 of the member 55 are housed in the respective openings 52, 54 and 53. A headed bolt 60 (FIGURE 7) received in a threaded bore 61 (FIGURE 8) of the member 55 retains the member 55 in the assembled position shown in FIGURE 7 of the drawing. An identical handle 62 is secured to each of the members 55 by means of a screw 63 passed through associated openings (unnumbered) in each of the handles and threaded into an associated threaded bore 69 in the portion 56 of each of the members 55. An identical spring 64 is connected between an end portion (unnumbered) of each of the handles 62 and an associated one of the arms 41, 42 as is best illustrated in FIGURE 6 of the drawings. The springs 64 normally bias the handles 62 to the positions illustrated in FIGURES 3 and 4 of the drawings and tend to bias the handles 62 toward the illustrated positions thereof when the handles 62 are pivoted toward the wall 38 of the body 37 (FIGURE 4) or toward the wheel rim R.

The purpose of the eccentric mounting of the arms 41–43 by means of the members 55 is to compensate for "run-out" tolerance i.e., the amount of wobble in commercially manufactured wheels, such as the wheel W of FIGURE 4. In most commercially manufactured wheels, the "run-out" tolerance at the wheel rim R ranges between $\frac{1}{16}$ to $\frac{3}{16}$ inch while wheel alignment specifications for many vehicles call for alignment to within $\frac{1}{32}$ of an inch and closer in some instances. Thus, without compensating for "run-out" tolerance, the wheel W or rim R could not be relied upon to be in true perpendicular to the spindle (not shown) of an automobile and all alignment devices which do not compensate for "run-out" tolerance cannot give accurate test results. The manner in which the eccentric members 55 are manipulated to compensate for "run-out" tolerance at the wheel rim R will be described hereafter.

The post 32 is mounted for pivoting movement in a vertical plane parallel to a plane through the wheel W by means of a pivotal connection (FIGURE 4) generally referred to by the reference numeral 65. The pivotal connection 65 comprises a stud 66 having external threads 67 and an internal threaded bore 68. An annular collar 70 of the body 37 is in external spaced concentric relationship to the stud 66. A pair of thrust washers 71 are received on the stud 66. With the thrust washers 71 assembled upon the stud 66, the latter is inserted through an opening (unnumbered) in a partition 72 (FIGURE 4) at the lower end portion 34 of the supporting post 32. A tension washer 73 and a nut 74 secure the supporting post 32 to the body 37 of the securing device 36 in the manner clearly illustrated in FIGURE 4 with the thrust washers 71 sandwiched between the partition 72 and an end face (unnumbered) of the collar 70. The nut 74 is tightened to increase the tension imparted to the connection 65 by the tension washer 73 and loosened to decrease the tension to thus regulate the force required to pivot the supporting post 32 btween the solid and phantom outline positions of FIGURE 1.

A locking device for securing the supporting post 32 in any position thereof relative to the securing device 36 is best illustrated in FIGURES 4 and 9 of the drawings and is generally referred to by the refernce numeral 75. The locking device 75 comprises a locking band 76 (FIGURE 9) partially surrounding a machined surface 77 of the collar 70 opposing and partially concentric to a semi-circular surface 78 of a collar 80 of the lower end portion 34 of the post 32. The collar 80 projects toward the convex wall 38 of the body 37, as is best illustrated in FIGURE 4 of the drawings. One end portion 81 of the locking band 76 is secured to a rotatable stud 82 (FIGURE 9) which is passed through an opening (unnumbered in FIGURE 4) in the partition 72 and journaled for rotation in a bore 83 of a journal 84 of the lower end portion 34. The stud 82 projects outwardly through a cover plate 85 (FIGURE 2) and a handle 86 is secured to the outwardly projecting end portion of the stud 82 by a screw 87 (FIGURE 4). An opposite end portion 88 of the locking band 76 is looped about a stud 90 (FIGURE 9) which is similarly passed through another opening in the partition 72, a bore in a journal corresponding to the journal 84 and an opening in the cover plate 85 (not shown). The stud 90 is fixed in this position by means not shown but a nut or a similar securing device could be secured to a threaded end portion of the stud 90 projecting outwardly of the cover plate 85.

The band 75 is shown in FIGURE 9 of the drawings in the unlocked position thereof in light engagement with the brake surface 77 of the collar 70. With the post 32 positioned in the solid or phantom outline positions of FIGURE 1, or any positions therebetween, the handle 86 is turned in a clockwise or counterclockwise direction to draw the locking band 76 into binding friction contact with the brake surface 77 of the collar 70 to lock the post 32 in any position of adjustment relative to the securing device 36. The stud 82 is preferably friction-fit in the journal 84 (FIGURE 4) and upon the release of the handle 86, the locking device 75 remains in its locked position. Only upon the rotation of the handle 86 to the position shown in FIGURE 9 will the locking device 75 be again unlocked by a loosening of the locking band 76 relative to the surface 77 of the collar 70.

Actuating means, generally referred to by the reference numeral 90, are provided for actuating the securing arms 41–43 for mounting the wheel aligner 30 to the rim R (FIGURE 4) or for removing the same therefrom. The actuating means or actuating device 90 includes a threaded shaft 91 threadably mounted in the threaded bore 68 of the stud 66 carried by the body 37 of the securing device 36. The threaded shaft 91 includes a first end portion 92 projecting away from the body 37 through an opening (unnumbered in FIGURE 4) in the plate 85, and a second end portion 93 having a reduced end 94 received in a bore 95 of an adaptor 96. A set screw 97 secures the adaptor body 96 to the end 94 of the threaded shaft 91 in the manner clearly illustrated in FIGURE 4 of the drawings. The adaptor body 96 includes a generally frusto-conical camming surface 97 which engages the surfaces 48 of the ends 47 of each of the securing arms 41–43. A retaining cap 100 is fastened to the adaptor body 96 by a threaded stud 101. The retaining cap 100 and the adaptor body 96 confine the ends 47 of the securing arms 41–43 therebetween, as shown in FIGURE 4 of the drawings. As the threaded shaft 91 is rotated clockwise, looking from the right in FIGURE 4, the adaptor body 96 is moved from right-to-left and the camming surface 97 bears against the cam surfaces 48 of the securing ends 47 to move the first end portions 44 of each of the arms 41–43 in an outward direction relative to the body axis for clamping engagement with the wheel rim R. Counterclockwise rotation of the threaded shaft 91 as viewed in this same figure causes left-to-right retraction of the adaptor body 96 and the return of the arms 41–43 toward a position with the first end portions 44 thereof closer together under the biasing forces of the springs 64.

An overriding clutch mechanism 105 forms a portion of the actuating means 90 to limit the clamping forces encountered during the application of the wheel aligner 30 upon the rim R of the wheel W to avoid stresses and distortions and to insure that each mounting of the wheel aligner 30 upon any automobile wheel will be repetitively consistent. The mechanism 105 includes a handle 106 (FIGURE 5) having a bore 107 and a relatively larger counterbore 108. The bore 107 is in a boss 110 projecting axially toward collar 70 of the securing device 36 (FIGURE 4). The first end portion 92 of the threaded shaft 91 carries a cross pin 111. The first end portion 92 of the shaft 91 has an unthreaded portion (unnumbered) which is rotatably received in the bore 107 and the counterbore 108. A tensing spring 112 is seated in the counterbore 108 surrounding the unthreaded end portion of the threaded shaft 91. A washer 113 and a screw 114 threaded in a bore (unnumbered) of the unthreaded portion of the threaded shaft 91 retains the tension spring 112 in the position illustrated in FIGURE 4 of the drawings.

Means in the form of a pair of diametrical grooves or channels 115, 116 in the boss 110 of the handle 106 cooperate with the cross pin 111 to regulate the clamping force of the securing arms 41–43. The grooves 115, 116 include a pair of opposed walls or surfaces 117, 118. The walls 117 of the grooves 115, 116 define curved camming surfaces while the walls 118 of the grooves 115, 116 define flat abutment surfaces.

With the cross pin 111 seated in the grooves 115, 116 the handle 106 of the mechanism 105 is rotated in a clockwise direction (FIGURE 5 and looking from the right in FIGURE 4) to cause the camming walls 117 of the grooves 115, 116 to contact opposite portions of the cross pin 111 to rotate the same and the shaft 91. This rotation moves the shaft 91 from right-to-left (FIGURE 4) in the manner heretofore described to clamp the securing arms 41–43 to the wheel rim R. The clamping force between the caps 45 and the wheel rim R is regulated by the force of the spring 112. As rotation of the handle 106 continues the cross pin 111 acting against the camming surfaces 117 urges the handle 106 to the right (FIGURE 4) under the counteraction of the spring 112 until the cross pin 111 is removed from the grooves 115, 116 and seats upon a terminal face of the boss 110. Continued rotation of the handle 106 would cause the cross pin 111 to again drop into the slots 115, 116 but because the predetermined clamping force between the securing arms 41–43 and the rim R has been attained, the cross pin 111 would again act against the cam surfaces 117 to disengage the handle 106 from the shaft 91. This coupling of the handle 106 to the threaded shaft 91 to provide an override at a predetermined clamping condition of the device 36 is inoperative when the handle 106 is rotated in a counterclockwise direction (FIGURE 5 and FIGURE 4 viewed from the right) for removing the wheel aligner 30 from the wheel W. Upon counterclockwise rotation of the handle 106 the cross pin 111 contacts the flat abutment surfaces 118 of the grooves 115, 116 and a drive connection is established for moving the shaft 91 from left-to-right (FIGURE 4) causing radial inward movement of the first end portions 44 of the securing arms 41–43. Because of the flat surface of the abutment walls 118, the handle 106 is prevented from being disengaged with the pin 111 and positive removal of the securing device 36 is effected.

As was heretofore noted, commercially manufactured wheels, represented by the wheel W of FIGURE 4, have a "run-out" tolerance which is the wobble of the wheel W in a vertical plane when rotated. The "run-out" tolerance of a wheel in the area of the rim R can range from $\frac{1}{16}$ to $\frac{3}{16}$ inch, and this range is illustrated by the distance D in FIGURE 4 of the drawings. The distance D is defined by a line $a$ indicating a vertical plane normal to the wheel axis and touching the outermost periphery of the rim R, and a line $b$ representing the deviation of the line $a$ upon rotation of the wheel W. The distance D, if uncompensated for, would directly effect any readings obtained by the wheel aligner 30 because of the mounting of the wheel aligner 30 upon the wheel W. For example, any deviation of the wheel W from the vertical plane $a$ would cause an identical deviation D′ between a vertical plane $a'$ taken through the longitudinal axis of the post 32 and normal to the shaft 91 and a line $b'$ representing the deviation from the vertical plane $a'$. That is, the deviation D of the wheel rim R from a true vertical plane $a$ causes a similar deviation D' of the post 32 from a similar vertical plane $a'$, and a corresponding deviation would result during tests performed with the wheel aligner 30. This same deviation exists, of course, in the body 37 of the securing device 36.

The cam members 55 (FIGURES 4, 6 and 7) compensate for such deviation caused by the "run-out" tolerance of the wheel W, as follows: With the wheel aligner 30 mounted in the position shown in FIGURE 4 upon the wheel rim R and the locking mechanism 75 unlocked an operator holds the supporting post 32 and rotates the wheel W (which is jacked clear of a floor or similar supporting surface). The amount of "run-out" is readily observable in the movement of the supporting post 32. Assuming an operator has observed a "run-out" tolerance or deviation D' in the area of the securing arm 41 (FIGURE 4) the wheel W is stopped, the handle 62 is grasped and rotated from the solid to the phantom outline position shown in FIGURE 4 of the drawings. This causes clockwise rotation of the eccentric member 55 which in turn causes a shifting of the securing device 36 in the direction of the headed arrow adjacent the eccentric member 55. This shifting of the body 37 in turn shifts the supporting post 32 to cause the plane $b'$ to move into coincidence with the vertical plane $a'$ thus shifting the supporting post 32 into a "true" vertical plane. The assembly remains in this adjusted position due to friction forces between the cam members 55 and the bores 52, 53 carried by the tension mounting of the arms 41–43. With the post 32 of the wheel aligner 30 now in a true "compensated" plane gauging operations can be carried out and results obtained are in no way effected by run-out tolerance of the wheel W.

Figure 2:
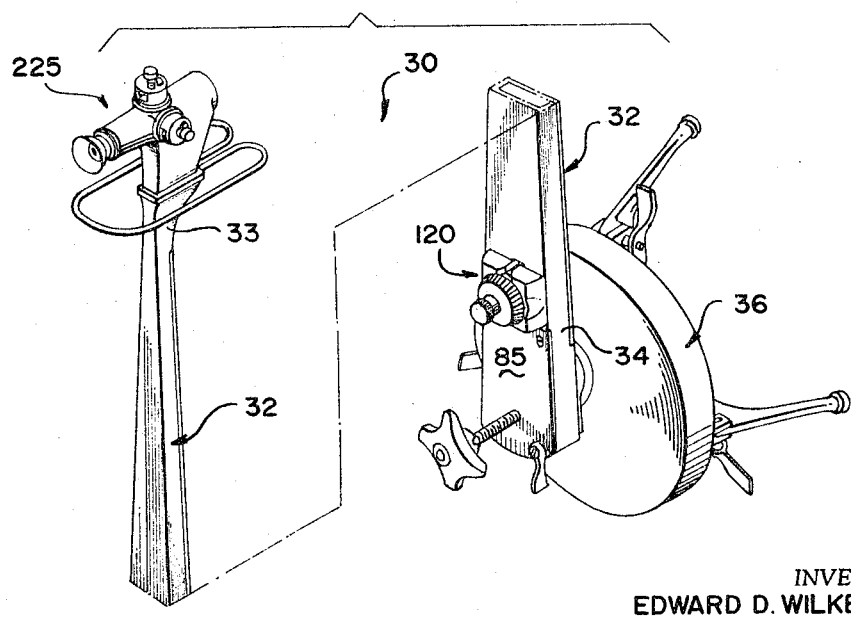
FIGURE 2 is an exploded perspective view of one of the wheel aligners of FIGURE 1, and illustrates a sight head secured to an upper end portion of a supporting post and a clamping mechanism secured at a lower end portion of the post for securing the wheel aligner to a vehicle wheel.

A caster gauge 120 is carried by the lower end portion 34 of the supporting post 32 (FIGURES 2 and 4). The caster gauge 120 is best illustrated in FIGURES 10 through 13 of the drawings and includes a housing 121 having a top wall 122, a bottom wall 123 (FIGURE 11), spaced side walls 124, 125 and a front wall 126. The housing 121 of the caster gauge 120 is secured in overlying relationship to an opening 128 (FIGURE 11) formed in a front plate 130 of the post 32. A level 131 is carried by the housing 121 in a slot or channel defined by a pair of spaced parallel walls 133, 134 projecting into a chamber 135 of the post 32. The walls 133, 134 are cut-out, as at 136 (FIGURE 11) at an end portion of the walls internally of the post 32, while opposite end portions of the walls 133, 134 are integrally joined to a partition wall 137 which is irregularly shaped and includes a generally U-shaped cut-out 138 (FIGURE 12).

A shaft 140 is journaled in a bore 141 of the partition wall 137. The shaft 141 includes a collar 142 at one side of the partition wall 137 (FIGURE 11) and a washer 143 and snap collar 144 at an opposite side of the partition wall 137. The elements 142–144 prevent axial shifting of the shaft 140. A first end portion 145 of the shaft 140 carries a handle or knob 146 secured to the end portion 145 by a set screw 147. Rotation of the dial 146 imparts rotation to the shaft 140 which in turn moves the level 131 in a vertical plane as will appear more fully hereinafter.

The first end portion 145 of the shaft 140 serves as a rotatable bearing for a sleeve 148 fixed to a cam 150 having a cam surface 151 of a gradual inclination terminating at an abrupt drop-off portion 152 (FIGURE 12). The sleeve 148 is friction-fit in a bore 153 (FIGURE 11) of a dial or handle 154 which is larger than the dial 146. A projecting first end portion 155 (FIGURE 11) of the level 131 rests upon the cam surface 151 of the cam 150. Upon rotation of the dial 154 in a clockwise direction as viewed in FIGURES 10 through 12 of the drawings, the cam surface 151 gradually raises the first end portion 155 of the level 131 to effect adjustment thereof in a manner and for a purpose to be described more fully hereinafter.

A second end portion 157 of the shaft 140 includes an integral cylindrical projection 158 eccentric relative to the axis of the shaft 140. The projecting or eccentric portion 158 is rotatable in a bore 160 of a bracket 161. Removal of the projecting end portion 158 from the bore 160 is prevented by upsetting a terminal end of the projecting portion 158. An upper end portion of the bracket 161 is bifurcated (FIGURE 13) and includes a pair of parallel spaced legs 162, 163. A second end portion 164 of the level 131 is embraced between the legs 162, 163 of the bracket 161 and is pivotally secured therebetween by means of a pin 166 received in a bore 167 of the second end portion 164 and fastened at opposite ends thereof to the legs 162 and 163. By rotating the dial 146 and holding the dial 154 immovable, the eccentric projecting end portion 158 will raise and lower the second end portion 164 of the level 131 as will appear more fully hereinafter.

The dial 154 includes a generally axially directed skirt 170 (FIGURES 10 and 11) having an external peripheral surface (unnumbered) provided with indicia 171 in the form of numbers indicating the degrees of rotation of the dial 154 relative to the level 131 in a clockwise or counterclockwise direction. The indicia ranges from zero to three degrees in clockwise direction as viewed in FIGURE 10 of the drawings and from the same zero position to six and one-half degrees in a counterclockwise direction. The indicia is placed on the skirt 170 in half degree increments with the portion of indicia from zero to six and one-half degrees indicating positive caster and the portion of indicia from zero to three degrees indicating negative caster.

The level 131 is formed of transparent plastic material and includes a chamber 175 opening toward the dial 154 (FIGURE 11). A vial 176 having a chamber (unnumbered) containing liquid is housed in a chamber 175 and an end portion 177 of the vial 176 tapers to a point (unnumbered) directed toward the indicia 171 of the dial 154, as is best illustrated in FIGURE 10 of the drawings. When testing automobile wheels for caster, the particular positive or negative caster is indicated by the pointed tapered portion 177 directed toward the indicia 171, as will appear more fully hereafter in describing the operation of the caster gauge 120.

The caster gauge 120 also includes a second level 180 in the top wall 122 of the housing 121 and a third level 181 in the side wall 124 of the housing. The levels 180 and 181 include vials corresponding to the vial 176 of the level 131, and the levels 180, 181 are used to position the post 32 in a vertical plane parallel to a plane taken through the vehicle wheels in the respective upright position shown in solid lines in FIGURE 1 and the horizontal position of the post 32 shown in phantom outline in this same figure.

The upper end portion 33 of the wheel aligner post 32 carries a sight head which is best illustrated in FIGURES 16 through 19 of the drawings, and is generally referred to by the reference numeral 225. The sight head 225 includes a housing 226 defining a chamber 227 having a first end portion 228 and a second end portion 229. A tubular stem 230 of the housing 226 is received in a bore 231 of the upper end portion 33 of the post 32. A set screw 232 (FIGURE 18) fixes the housing 226 to the post 32.

A light bulb 233 is mounted by a suitable electric fixture 234 in the chamber 227 adjacent the second end portion 229. Conductors 235 connect the light bulb 233 with a plurality of D.C. batteries (not shown) mounted in brackets (also not shown) in the lower end portion 34 of the post 32. A suitable switch (not shown) may be conventionally operated to illuminate and extinguish the light or lamp 233, the latter functioning when energized to illuminate various dials and targets of the sight head 225 as will appear more fully hereafter.

A sight tube 235 is positioned generally internally of the chamber 227 and includes a first end portion 236 projecting outwardly of the first chamber portion 228 and a second end portion 237 terminating in the second chamber portion 229. The sight tube 235 is mounted in the sight head chamber 227 by means of a gimbal connection 240. The gimbal connection 240 includes an annular gimbal ring 241 pivotally mounted for movement in a vertical plane by means of diametrically opposed set screws 242, 243 (FIGURE 17) threaded in the housing 226 and having pointed ends (unnumbered) received in complementary conical recesses (also unnumbered) in the gimbal ring 241. The sight tube 235 is mounted for movement in a horizontal plane by means of a similar pair of diametrically opposed pointed set screws 244, 245 (FIGURE 18) threaded in the gimbal ring 241 and having end portions received in complementary conical recesses in the second end portion 237 of the sight tube 235.

The first end portion 236 of the sight tube 235 is provided with an eye piece 250 having a "peep hole" 251. A stem 252 of the eye piece 250 is force-fit into a bore 253 of the sight tube 235. A tension spring 254 surrounds the first end portion 236 of the sight tube 235 between a shoulder (unnumbered) of the eye piece 250 and a washer 255.

The second end portion 237 of the sight tube 235 carries a transparent insert 256 (FIGURES 18 and 19) having a cross hair mark 257.

Means in the form of a pair of screws 260 and 261 are provided for moving the sight tube 235 in vertical and horizontal planes respectively.

The screw 260 includes a knurled head 262 exposed externally of the sight head housing 226. An unthreaded cylindrical portion 263 of the screw 260 passes through an opening or bore 264 in a cap-like member or housing 265. The housing 265 includes a top wall 266 having a portion thereof removed to define a view hole 267 and a pointer 268. A peripheral skirt portion 270 of the cap-like member 265 similarly has a portion removed to define a view opening 271 and a pointer 272. The cap-like member 265 is immovably secured in the position illustrated in the drawings by a plurality of connections generally referred to by the reference numeral 273. The connections 273 each include a nib projecting axially downwardly from the bottom edge of the skirt 270 received in a corresponding indentation or hole formed in a flat portion 274 of the housing 226. A tension spring 275 between the knurled head 262 of the screw 260 and the top wall 266 of the cap-like member 265 biases the latter member downwardly to maintain the nibs and openings of the connections 273 in engagement. One or more of such connections may be provided for insuring proper location of the cap-like member 265 upon the housing 226.

A threaded portion 276 of the screw 260 is threaded in a vertical threaded bore (unnumbered) of the housing 226. The threaded end portion 276 of the screw 260 terminates in and end portion 277 contacting a bead-like portion 278 of the sight tube 235. As the screw 260 is rotated in a clockwise direction (FIGURE 16) the end portion 277 acting against the portion 278 of the sight tube 235 causes a counterclockwise pivoting of the sight tube 235 about the set screws 242, 243 in a vertical plane (FIGURE 18). Upon retraction of the set screw 260 the sight tube 235 is automatically pivoted in a clockwise direction as will appear more fully hereafter.

A dial 280 has an inner skirt portion (unnumbered) surrounding the cylindrical portion 263 of the screw 260 and secured thereto by means of a set screw 281 (FIGURE 18). The dial 280 includes a top wall 282 and a peripheral skirt 283 which include respective indicia 284, 285 (FIGURE 21) viewable through the respective openings 267 and 271. The indicia 284 includes a plurality of indications (unnumbered) between zero and twelve in a clockwise and counterclockwise direction as viewed in FIGURE 27 of the drawings. As viewed in this latter figure, the clockwise indications from zero to twelve indicate negative toe-in in one-sixteenth inch increments while the indications in a counterclockwise direction indicate positive toe-in in one-sixteenth inch increments, as will be more apparent hereinafter. The indicia 285 indicates positive degrees of camber reading right-to-left from the zero in FIGURE 27 and negative degrees of camber reading left-to-right from the zero in this same figure. The indicia means 285 are in half degree graduations. Both camber and toe-in indicia are provided on the dial 280 because the wheel aligner is capable of operating in both a horizontal and vertical plane, as will appear more fully hereafter.

The screw 261 is identical to the screw 260 and includes a knurled head 292 and a smooth cylindrical portion 293 received in a circular opening or aperture 294 of a cap-like member 295. The cap-like member 295 includes a wall 296 having a portion thereof removed to define a view hole or opening 297 (FIGURE 16) and a pointer 298. A peripheral skirt 300 of the cap-like member 295 is similarly broken away to form a view opening 301 and a pointer 302 (FIGURE 16). The cap-like member 295 is connected to a flattened portion 303 (FIGURE 19) of the housing 226 by connections corresponding to the connections 273 (FIGURE 18) and a tension spring 304 corresponding to the tension spring 275. A threaded portion 306 of the screw 261 is threadably received in a complementary bore 307 of the housing 226. The threaded portion 306 terminates in an end portion 308 bearing against the bead-like cylindrical portion 278 of the sight tube 235 (FIGURE 17). By rotating the screw 261 clockwise, as viewed in FIGURE 17 of the drawings, the sight tube 235 is moved in a horizontal plane by pivoting between the set screws 244, 245. Return of the sight tube 235 is automatic upon the retraction of the screw 261 as will be apparent hereinafter.

A dial 310 corresponding to the dial 280 is fixed to the cylindrical portion 293 of the screw 261 by a set screw (not shown) corresponding to the screw 281 (FIGURE 18). The dial 310 includes a wall 311 and a peripheral skirt (unnumbered) provided with indicia means 312 and 313 respectively (FIGURE 26). The indicia 312 are viewable through the opening 297 and indicate positive and negative degrees of camber from zero to two and one-half degrees when read respectively in clockwise and counterclockwise directions from zero. The indicia means 313 indicate positive and negative toe-in from zero when read from zero right-to-left and left-to-right respectively. Indicia means 313 are viewable through the opening 301 of the cap-like member 295, and are in one-sixteenth inch increments.

Means for providing the automatic return of the sight tube 235 upon the retraction of either of the screws 260, 261 is a tension spring 320 (FIGURE 19) externally surrounding the sight tube 235 between the gimbal mounting means 240 and the screws 260, 261 (FIGURE 18). The spring 320 surrounds approximately 270° of the sight tube 235 and includes one end portion 321 fastened by a screw 323 (FIGURE 18) to the housing 226. A second end portion 324 (FIGURE 17) of the spring 320 is similarly secured to the housing 226 by a screw 325. The screws 260 and 323 are in common vertical planes while the screws 261 and 325 are in common horizontal planes. As will be best understood by referring to FIGURE 19, upon the upward retracting movement of the screw 260 the spring 320 tends to contract and urges the sight tube 235 to follow the movement of the screw 260. Similar retraction of the screw 261 causes following movement of the sight tube 235 under the force of contraction of the spring 320. In this manner, positive movement of the sight tube in two planes disposed ninety degrees to each other is assured upon both inward and outward movement of the screws 260, 261 with the latter movement effecting automatic return of the sight tube 235.

The second end portion 229 of the chamber 227 is closed by a generally annular target 330 (FIGURES 17, 18 and 25). The target 25 is seated in an annular recess (unnumbered) in a face 331 of the housing 226 (FIGURE 18). A plurality of identical fasteners 332 passed through openings 333 and received in associated threaded bores 334 secure the target 330 in position. The target is preferably constructed from plastic material and includes a central circular opening or aperture 335. The aperture 335 permits an operator to view through the sight tube 235 (FIGURE 18) along a line of sight passing through the aperture 335 at another identical target as will be more apparent hereinafter. The target 330 includes a cross hair marking 336 formed by painting or otherwise marking the target 330 as indicated by the stippling in FIGURE 25 of the drawings. The target 330 is otherwise devoid of indicia and, except for the cross hair 336, the remainder of the target 330 is translucent. This construction of the target 330 permits the lamp 233, when energized, to illuminate the target 330 for performing wheel alignment tests under poor lighting conditions.

A member 340 (FIGURE 16) attached to the upper end portion 33 of the post 32 serves the dual function of providing a handle for manipulating the wheel aligner 30 and also acts as a guard to prevent accidental or inadvertent damage being caused to the sight head 225. The member 340 is secured to the upper end portion 33 of the post 32 by force-fitting identical end portions 341, 342 into cylindrical bores 343, 344 respectively (FIGURES 18 and 19).

*Toe-in test (across-the-front)*

Figure 20:
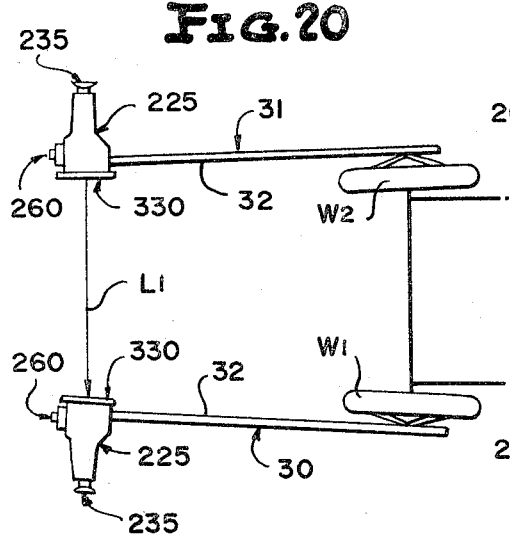
FIGURES 20 and 21 are diagrammatic plan views illustrating the method of illustrating the wheel aligner to test "toe-in" of steerable wheels of a vehicle.

The operation of the wheel aligner 30 in conjunction with another identical wheel aligner 31 will now be described in the performance of a toe-in test which is diagrammatically illustrated in FIGURES 20 and 21 of the drawings. For this test the wheel aligners 30 and 31 are secured to respective wheels W1 and W2 in the manner heretofore described in connection with the wheel W of FIGURE 4 of the drawings. The wheels W1 and W2 are preferably supported on respective turntables T1 and T2 (FIGURE 1). It is assumed the necessary compensation for "run-out" tolerance of the wheels W1 and W2 has been effected.

The toe-in test of the vehicle V of FIGURE 1 can be performed over-the-hood (H) when the wheel aligners 30, 31 are in a vertical position (solid lines in FIGURE 1) or across-the-front (F) when the wheel aligners 30, 31 are in a horizontal position (phantom outline in FIGURE 1). In either of these positions the wheel aligners 30, 31 are synchronized in either a vertical or a horizontal plane by means of the levels 180, 181 (FIGURES 10 and 12) carried by the walls of the caster gauge 120. That is, a true vertical position of the post 32 can be obtained by observing the usual "bubble" of the level 180 while a true horizontal position of either the post 32 can be similarly achieved by centering the "bubble" of the level 181. In either a horizontal or a vertical position the locking mechanism 75 (FIGURE 9) is actuated to secure the post 32 of the wheel aligners 30, 31 in position.

It is assumed the wheel aligners 30, 31 are in a horizontal position (phantom outline in FIGURE 1 and FIGURES 20, 21) and in this position, the vehicle V is preferably supported by a conventional service station rack or lift so that the sight heads 225, 225 are at eye level to an operator performing the toe-in test.

The dials 280 are preferably, although not necessarily, set to zero by rotating the screws 260 (FIGURE 20) of each of the sight heads 225. This causes movement of the associated sight tubes 235 of each of the aligners 30, 31 in a plane parallel to the supporting post axes i.e., a horizontal plane. This brings the "0" of the idicia 284 (FIGURE 27) into alignment with the pointer 268 (FIGURE 16) of each of the sight heads 225. The target 330 of the wheel aligner 30 is then viewed through the sight tube 235 of the wheel aligner 31 and, if necessary, the post 32 of the wheel aligner 31 is appropriately moved to zero-in on the target 330 of the wheel aligner 30 along a line of sight L1 (FIGURE 20). Zeroing-in is complete when the cross hair 257 of the sight tube 235 of the wheel aligner 31 is centered on or coincident with the cross hair 336 of the target 330 of the wheel aligner 30.

Figure 21:
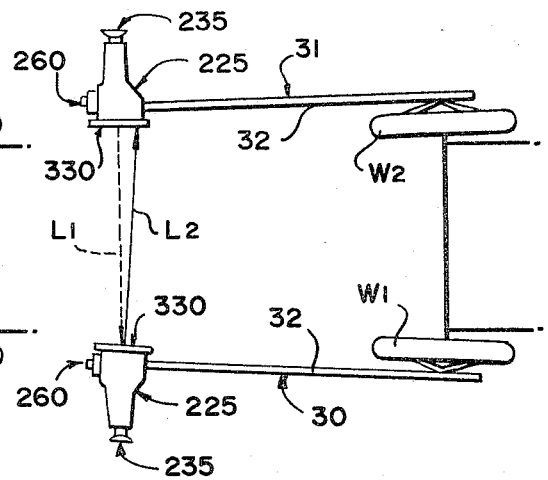

The operator then views the target 330 of the wheel aligner 31 through the sight tube 235 of the wheel aligner 30 (FIGURE 21). If positive toe-in is present, as is the case in FIGURES 20 and 21, a line of sight L2 impinges upon the target 330 of the wheel aligner 31 at a particular distance to the right of the center of the cross hair 336 of this latter target, while a line of sight to the left of center would indicate negative toe-in. The screw 260 of the wheel aligner 30 is appropriately turned causing pivotal movement of the associated sight tube 235 in a horizontal plane. This same turning motion imparted to the screw 260 moves the indicia 284 carried thereby past the opening 267 (FIGURE 16) in the cap-like member 265 until a point is reached at which the cross hair 257 of the wheel aligner 30 is coincident with or zeroed-in on the target cross hair 336 of the wheel aligner 31. The combined toe-in (whether positive or negative) is now read in inches or fractions thereof through the opening 267 of the latter cap-like member 265 as indicated by the pointer 268, and appropriate adjustment of the vehicle front end may be thereafter made, if necessary.

The vehicle V can, of course, be similarly tested for toe-in by repeating the above procedure beginning with the sighting of the target 330 of the wheel aligner 31 through the sight tube 235 of the wheel aligner 30. The combined toe-in would then be observed through the opening 267 in the cap-like member 265 of the wheel aligner 31.

*Toe-in test (over-the hood)*

The vehicle V can also be tested for toe-in over-the-hood (H) in the manner above described but with three basic exceptions:

(I) The vehicle V is not supported on a rack or otherwise elevated except for the support of the wheels W1 and W2 on the respective turntables T1 and T2.

(I) The wheel aligners 30, 31 are disposed in an upright position (solid lines of FIGURE 1) and;

(III) The screw 261 of either of the wheel aligners 30, 31 is manipulated to obtain a reading of toe-in as indicated by the indicia 313 viewable through the opening 301 of the sight heads 225. That is, when testing a vehicle for toe-in across-the-front the screws 260 move the sight tubes 235 of the sight heads 225 in horizontal planes while in the over-the-hood testing for toe-in, the screws 261 move the sight tubes 235 in horizontal planes. Thus, the sight heads 225 of the wheel aligners 30, 31 are operative in two planes disposed ninety degrees apart and in each of these planes (horizontal or vertical planes) a correct indication of the toe-in condition of a vehicle can be determined.

*Camber test (over-the hood)*

Figure 22:
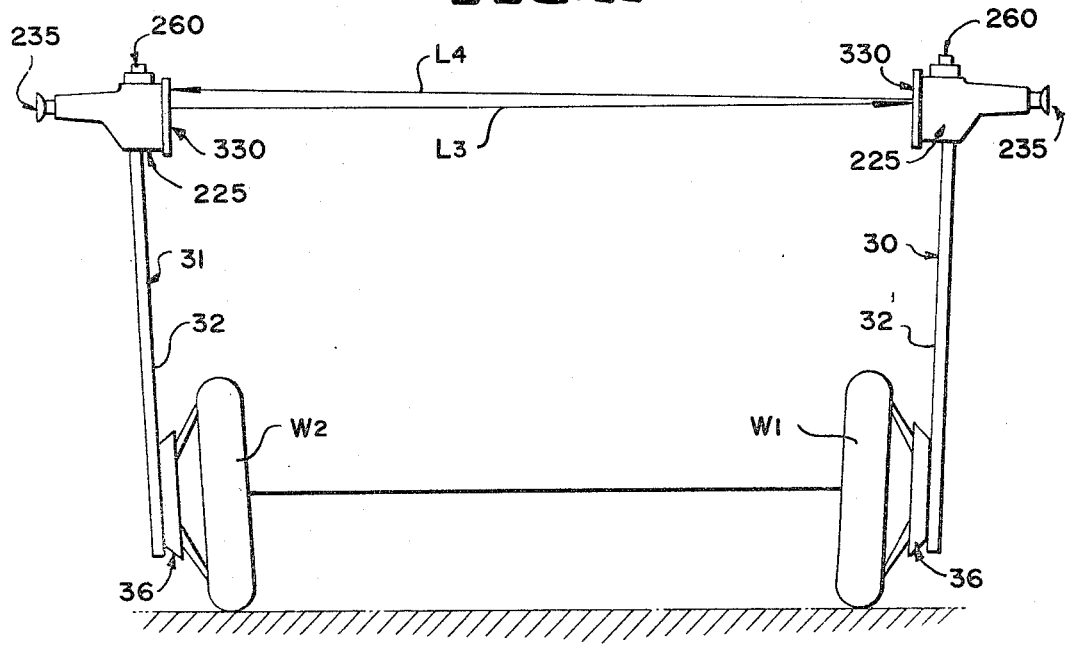
FIGURE 22 is a diagrammatic view illustrating the method of using the wheel aligner of the invention in testing the "camber" of a vehicle wheel.

In FIGURE 22 of the drawings is diagrammatically illustrated the method of testing the wheels W1, W2 for camber by use of the wheel aligners 30, 31 of this invention. The wheel aligners 30, 31 are clamped to the wheels W1, W2 in the manner heretofore described and, in this case, are in an upstanding position to test over-the-hood of the vehicle V, as shown in solid lines in FIGURE 1 of the drawings.

The camber test is performed in the general manner of the toe-in test by, for example, viewing the target 330 of the wheel aligner 30 through the sight tube 235 of the sight head 225 carried by the wheel aligner 31 and moving the post 32 of the wheel aligner 31 to zero-in on the target 330 of the wheel aligner 30 along a line of sight L3 (FIGURE 22).

The operator then views the target 330 of the wheel aligner 31 through the sight tube 235 of the wheel aligner 30 along a line of sight L4. If positive camber is present, as in FIGURE 22, the line of sight L4 impinges upon the target 330 of the wheel aligner 31 at a particular distance above the center of the target cross hair 336 while a line of sight below center would indicate negative camber. The screw 260 of the wheel aligner 30 is appropriately turned causing vertical pivoting movement of the associated sight tube 235 and movement of the indicia 285 carried by the screw 260 until the sight tube cross hair 257 of the aligner 30 is zeroed-in on the target cross hair 336 of the wheel aligner 31. The camber, whether positive or negtive, is now read in degrees or fractions of degrees through the opening 271 of the wheel aligner 30 is indicated by the pointer 272 (FIGURE 16) and appropriate adjustment of the vehicle front end may thereafter be accomplished.

Camber of the vehicle V can, as in the case of toe-in tests, be tested by repeating the above procedures beginning instead by first sighting the target 330 of the wheel aligner 31 through the sight tube 235 of the wheel aligner 30 and obtaining a final reading of camber by manipulating the screw 260 of the wheel aligner 31.

*Camber test (across-the-front)*

The vehicle V can also be tested for camber across-the-front (F) in the manner above-described with three basic exceptions:

(I) The vehicle V is preferably elevated on a rack or similar support to place the sight heads 225 of the wheel aligners 30, 31 at eye level to an operator.

(II) The wheel aligners 30, 31 are disposed in a horizontal plane (phantom outline in FIGURE 1) and;

(III) The screw 261 of either of the wheel aligners 30, 31 is manipulated to obtain a reading of camber as indicated b ythe indicia 312 viewable through the opening 297 of the sight head 225 as indicated by the pointer 298 (FIGURE 16). That is, in across-the-front testing for camber the screws 261 move the sight tubes 235 in a vertical plane while horizontal pivoting movement of the sight tubes is obtained by manipulating the same screws when the wheel aligners 30, 31 are positioned upright.

From the above it will be evident that an operator can determine both toe-in and camber in either a vertical or horizontal position of the wheel aligners 30, 31 by manipulating the appropriate screws 260, 261 to pivotally move the sight tubes 235 in the necessary planes and thereafter read the results from the camber indicia 285, 312 or the toe-in indicia 284, 313 through the respective openings 271, 297, 267 and 301.

*Caster test*

To test caster, which is the camber of the wheels when "cut" from a "straight forward" steering position, the aligners 30, 31 are first secured to the respective wheels W1, W2 and while the wheels are in a "straight forward" position the posts 32 are positioned in a true vertical plane by means of the level 180 carried by the caster gauges 120. The caster test is identically performed on each wheel of the vehicle and the same will be described with particular attention directed to the testing of the wheel W1 (FIGURES 23 and 24).

Figure 23:
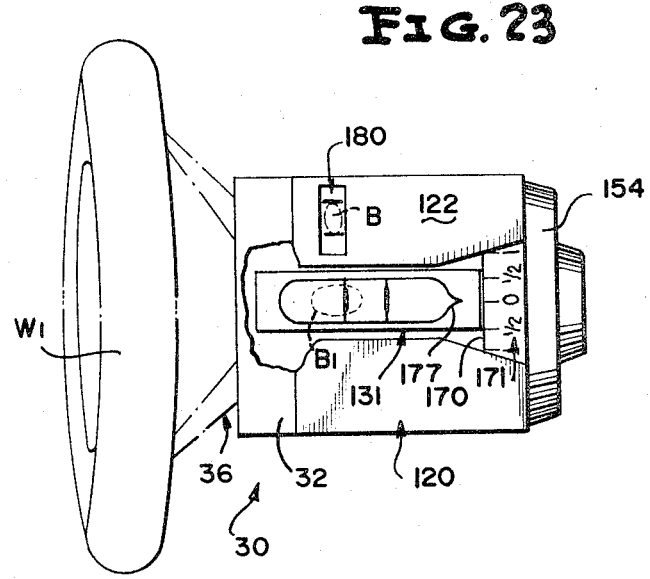
FIGURES 23 and 24 are plan views of a steerable wheel illustrating the method of testing "caster" by the wheel aligner of this invention.
Figure 24:
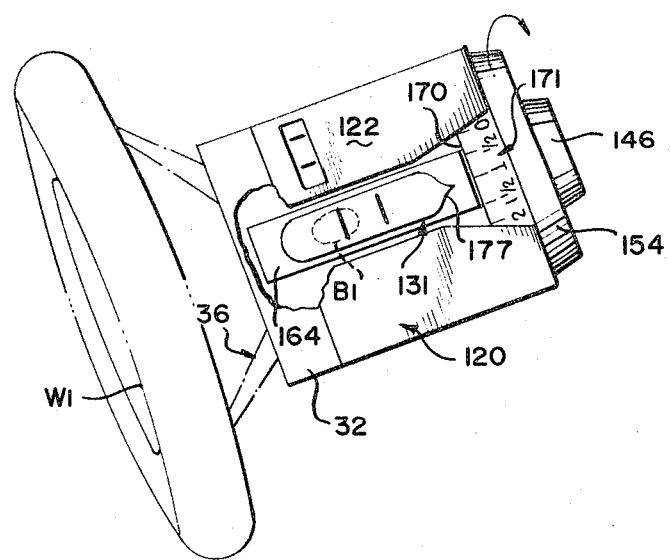

When the post 32 of the wheel aligner 30 is in a true vertical position (FIGURE 23), the usual liquid "bubble" B of the level 180 in the top wall 122 of the caster gauge 120 is centered (FIGURE 23) and the locking mechanism 75 (FIGURE 4) is activated to lock the post 32 in the position illustrated in FIGURE 23.

While the wheels W1, W2 are in a "straight forward" position the large dial 154 of the caster gauge 120 is rotated either clockwise or counterclockwise (FIGURE 14) until the end portion of pointer 177 of the chamber 176 of the level 131 is opposite the "0" of the indicia 171 on the dial skirt 170 (FIGURES 10 and 23). If the floor upon which the wheels W1, W2 are supported is level, the "bubble" B1 in the chamber of the vial 176 is centered, thereby indicating this level condition. However, as is more generally the case, the "bubble" B1 of the level 131 is off-centered because of an uneven floor or similar support, uneven tire wear, improper tire inflation or similar factors. FIGURE 23 of the drawings illustrates the bubble B1 shown in an off-centered position and, unless otherwise compensated for, would prevent an inaccurate determination of caster.

To compensate for this condition, the large dial 154 is held motionless and the small dial 146 of the caster gauge 120 is rotated (FIGURE 15). If the bubble B1 of the level 131 is off-centered toward either end portion 155, 164 of the level 131, the rotation of the dial 146 causes upward or downward movement of the end portion 164 (FIGURE 15) of the level 131 by means of the eccentric connection 158, 160. By appropriately rotating the small dial 146, the bubble B1 is shifted to the center of the vial (FIGURE 11) to indicate a compensated level condition. Since the large dial 154 is held immobilized during this manipulation of the small dial 146, the end portion 177 still indicates "0" on the indicia 171 of the large dial 154 (FIGURE 10).

The wheels W1, W2 are now turned or cut (FIGURE 24) to swing each of the wheel aligners 30, 31 partially around the associated kingpins (not shown). If caster is present the bubble B1 of the level 131 will no longer centered, as illustrated in FIGURE 24 of the drawings. The small dial 146 is now held immobilized and the large dial 154 is rotated clockwise or counterclockwise (FIGURES 14 and 24). If positive caster is present, as in FIGURE 24, the bubble B1 of the level 131 is off-centered toward the end portion 164 of the level and clockwise rotation of the dial 154 causes the cam 150 to lift the end portion 155 (FIGURE 14) of the level 131 upwardly to bring the bubble B1 to a center position. This same rotation of the large dial 154 moves the indicia 171 past the pointer 177 of the vial 176 in ascending half-degree increments from zero toward six and one-half. When the bubble B1 is centered the pointer 177 of the level 131 indicates the degrees or fraction of degrees of caster on the indicia 171 of the large dial 154.

In the case of negative caster, the bubble B1 of the level 131 is off-centered toward the end portion 155 of the level and counterclockwise rotation of the dial 154 causes the cam 150 to lower the front end portion 155 of the level 131 until the bubble B1 is centered. This same rotation moves the indicia 171 past the pointer 177 of the level 131 in ascending half-degree increments from zero toward three. When the bubble is centered, the negative caster in degrees or fractions of degrees is read from the dial 154 at the point indicated by the pointer 177 of the chamber 176.

*Quick-test aligning*

The toe-in, caster, and camber tests heretofore described assure accurate results because of the detailed compensation for various factors achieved by the wheel aligners 30, 31. However, most service stations demand a "quick-test" procedure for determining wheel misalignment and the wheel aligner of this invention is equally capable of performing such quick-tests.

As was heretofore described, each of the eccentric members 55 is biased under the influence of a tension spring 64 between an associated one of the securing arms 41–43 and the handles 62. In a preferred form of the invention, the springs 64 automatically rotate the eccentric members 55 to a zero position in order that the wheel aligner 30 or 31 will give accurate test results when mounted upon vehicle wheels W1, W2.

As will be readily apparent from FIGURE 4 of the drawings, the use of a sufficiently heavy spring for each of the springs 64 would effect automatic shifting of the arms 41, 43 toward the phantom outline position in FIGURE 4 with respect to the securing arm 41. Thus, by securing the wheel aligner 30 to the wheel W and operating the actuating mechanism 90, the securing arms 41 through 43 will each first lightly contact a rim R and upon subsequent actuation of the means 90 any of the arms which are offset from the remaining of the arms due to a deviation in the rim R will be urged under the tension of the associated springs 64 toward the phantom outline position illustrated in this figure. Thus, automatic compensation for wheel run-out is effected and thereafter the locking mechanism 75 is actuated to secure the securing device 36 relative to the post 32 of the wheel aligner 30. Thereafter, any one of the tests heretofore described can be performed on the vehicle V.

*Steering high point test*

For various reasons, the steering gear worm is "cam ground" with a high point in the center so that when the car is being driven "straight forward" all play will be eliminated from the steering gear box. This position is keyed to the steering wheel spoke position for ease of handling, etc. and a versatile wheel aligner should be capable of readily determining the steering high point position of the front end. The wheel aligners 30, 31 are capable of accurately checking this condition as follows:

(I) A spoke of the vehicle steering wheel (unnumbered); is set to indicate a "straight forward" steering position.

(II) The front wheels W1 and W2 are observed and checked for this "straight forward" position, and (III) The relative alignment of the two wheels W1 and W2 is then checked for toe-in in the manner heretofore described in the Toe-In Test.

If the results of the Toe-In Test indicate that the wheels W1 and W2 are set within the specifications required for the particular vehicle V under test, the same is a direct indication that the high point of the steering gear worm is centered.

While a preferred form of the wheel aligner of this invention for accomplishing the object thereof has been heretofore described, it is to be understood that various changes may be made in the details of construction and arrangement of parts without departing from the spirit and scope of this invention.

I claim:

1. A wheel aligner comprising a support post having upper and lower end portions, means at said lower end portion for positioning the wheel aligner relative to an automobile spindle with the support post thereof in either horizontal or vertical planes, viewing means at said upper end portion, first means for moving said viewing means in a vertical plane, second means for moving said viewing means in a horizontal plane, and means associated with each of said first and second moving means for determining the amount of movement of said first and second moving means in each of said planes relative to a viewed target in both the vertical and horizontal planes of said support post.

2. A wheel aligner comprising a support post having upper and lower end portions, means for positioning said support post in horizontal and vertical planes, viewing means at said upper end portion, first means for moving said viewing means in a vertical plane, second means for moving said viewing means in a horizontal plane, and means associated with each of said first and second moving means for determining the amount of movement of said first and second moving means in the respective vertical and horizontal planes in both vertical and horizontal planes of said support post.

3. A wheel aligner comprising a support post having upper and lower end portions, means at said lower end portion for selectively positioning the wheel aligner in vertical and horizontal planes, viewing means at said upper end portion, first means for moving said viewing means in a vertical plane, second means for moving said viewing and means in a horizontal plane, means associated with each of said first and second moving means for determining the amount of movement of said first and second moving means in each of said planes relative to a target viewed through said viewing means along a line of sight in both vertical and horizontal planes of said support post.

4. A wheel aligner comprising a support post having upper and lower end portions, means at said lower end portion for securing the wheel aligner to an automobile wheel, viewing means at said upper end portion, means for positioning said support post in horizontal and vertical planes, viewing means at said upper end portion, first means for moving said viewing means in a vertical plane, second means for moving said viewing means in a horizontal plane, means associated with each of said first and second moving means for determining the amount of movement of said first and second moving means in the respective vertical and horizontal planes relative to a target viewed through said viewing means along a line of sight in both vertical and horizontal planes of said support post, and means compensating for wheel rim run-out by providing relative adjustment of said support post relative to the wheel rim whereby said support post is maintained in a compensated plane generally normal to the wheel axis in both vertical and horizontal planes of said support post.

5. The wheel aligner as defined in claim 2 including means at said lower end portion for securing the wheel aligner relative to an automobile spindle, said positioning means being effective for pivoting said support post between vertical and horizontal positions, means for retaining said support post in said vertical and horizontal position, and gauge means for indicating when said support post is positioned in true horizontal and vertical planes.

6. The wheel aligner as defined in claim 2 including gauge means carried by said support post, said gauge means including a leveling vial and indicia means, and means in said vial defining an indicator directed toward said indicia means.

7. The wheel aligner as defined in claim 6 wherein said indicator defining means is a liquid chamber of said leveling vial.

8. A wheel aligner comprising a support post having upper and lower end portions, means at said lower end portion for securing the wheel aligner relative to an automobile spindle, viewing means at said upper end portion, first means for moving said viewing means in a vertical plane, second means for moving said viewing means in a horizontal plane, means asociated with each of said first and second moving means for determining the amount of movement of said first and second moving means in each of said planes relative to a target viewed through said viewing means along a line of sight in both vertical and horizontal planes of said support post, means for positioning said support post in vertical and horizontal planes, leveling means for indicating when said post is positioned in true horizontal and vertical planes, means compensating for wheel rim run-out by providing relative adjustment of said support post relative to the automobile wheel whereby said support post is maintained in a compensated plane generally normal to the wheel axis for preventing incorrect determinations by said determinating means and incorrect indicating by said leveling means, and means for indicating the inclination of said support post in a second vertical plane normal to said first mentioned vertical plane.

9. The wheel aligner as defined in claim 2 wherein said viewing means includes a sight head comprising a housing, a chamber defined by said housing, said chamber having opposite open ends, a sight tube at least partially positioned in said chamber, a member closing one of said ends, and means defined by said member for permitting the viewing of an object through said member by sighting through said sight tube.

10. The wheel aligner as defined in claim 2 wherein said viewing means includes a sight head comprising a housing, a chamber defined by said housing, said chamber having opposite open ends, a sight tube at least partially positioned in said chamber, a member closing one of said ends, said member including means defining a target, and said member further including means for permitting the viewing of an object through said member by sighting through said sight tube.

11. A wheel aligner comprising a support post having upper and lower end portions, means at said lower end portion for selectively positioning the wheel aligner relative to an automobile spindle in both horizontal and vertical planes, viewing means in the form of a sight head at said upper end portion, said sight head comprising a housing, a chamber defined by said housing, a sight tube, means mounting said sight tube in said housing for movement in at least two planes offset 90 degrees from each other, first means for moving said sight tube in a first of said planes, second means for moving said sight tube in a second of said planes, and means associated with each of said first and second moving means for determining the amount of movement of said first and second moving means in each of said planes relative to a viewed target.

12. A wheel aligner comprising a support post having upper and lower end portions, means at said lower end portion for selectively positioning the wheel aligner relative to an automobile spindle in both horizontal and vertical planes, viewing means in the form of a sight head at said upper end portion, said sight head comprising a housing, a chamber defined by said housing, a sight tube, means mounting said sight tube in said housing for movement in at least two planes offset 90 degrees from each other, first screw means for moving said sight tube in a first of said planes, second screw means for moving said sight tube in a second of said planes, and means carried by each of said first and second screw means for indicating the amount of movement of said sight tube in each of said planes relative to a viewed target upon the movement of said screw means.

13. The wheel aligner as defined in claim 12 wherein said screw means move said sight tube in a first direction in each of said associated planes and biasing means are provided for automatically moving said sight tube in a second direction opposite to said first direction.

14. The wheel aligner as defined in claim 12 wherein said screw means move said sight tube in a first direction in each of said associated planes, biasing means for automatically moving said sight tube in a second direction opposite to said first direction, and said biasing means including a spring at least partially surrounding said sight tube.

15. A wheel aligner comprising a support post having upper and lower end portions, means at said lower end portion for selectively positioning the wheel aligner relative to an automobile spindle in both horizontal and vertical planes, viewing means in the form of a sight head at said upper end portion, said sight head comprising a housing, a chamber defined by said housing, a sight tube, gimbal means mounting said sight tube in said housing for movement in two planes offset 90 degrees from each other, a first screw threaded in said housing for moving said sight tube in a first direction in a first of said planes, a second screw threaded in said housing for moving said sight tube in a first direction in a second of said planes, said first and second screws carrying respective first and second means for indicating the amount of movement of said sight tube in each of said planes relative to a viewed target, and spring means secured to said housing in said chamber and partially surrounding said sight tube for automatically moving said sight tube in second directions opposite to said first directions in said first and second planes upon the movement of said screws in said second directions.

16. The wheel aligner as defined in claim 15 wherein said screws are mounted for movement in two planes offset 90 degrees from each other and said spring means enclose an angle of at least 180 degrees in the surrounding relationship thereof relative to said sight tube.

17. A wheel aligner comprising a support post having upper and lower end portions, means at said lower end portion for selectively positioning the wheel aligner relative to an automobile spindle in both horizontal and vertical planes, viewing means in the form of a sight head at said upper end portion, said sight head comprising a housing, a chamber defined by said housing, a sight tube, means mounting said sight tube in said housing for movement in two planes offset 90 degrees from each other, a first screw threaded in said housing for moving said sight tube in a first direction in a first of said planes, a second screw threaded in said housing for moving said sight tube in a first direction in a second of said planes, said first and second screws including respective first and second members provided with indicia, first and second means on said housing cooperative with the indicia of the respective first and second members for indicating the angular movement of said sight tube in each of said planes relative to a viewed target, spring means for automatically moving said sight tube in second directions opposite to said first direction in said first and second planes upon the movement of said screws in said second directions, and target means carried by said housing.

18. The wheel aligner as defined in claim 17 wherein said chamber includes first and second opposite open ends, said sight tube having a first end portion projecting outwardly of said housing through said first open end, said sight tube having a second end portion terminating in said housing adjacent said second open end, said target means closing said second open end, and means defined by said target for permitting the viewing of an object through said target by sighting through said sight tube first end portion.

19. The wheel aligner as defined in claim 17 wherein said target means includes marking means, and marking means carried by said sight tube corresponding to the marking means of said target means.

20. A wheel aligner comprising a support post having upper and lower end portions, means at said lower end portion for selectively positioning the wheel aligner relative to an automobile spindle in both horizontal and vertical planes, viewing means in the form of a sight head at said upper end portion, said sight head comprising a housing, a chamber in said housing, a sight tube, means mounting said sight tube in said housing for movement in two planes offset 90 degrees from each other, first means for moving said sight tube in a first direction in a first of said planes, second means for moving said sight tube in a first direction in a second of said planes, said first and second means including respective first and second indicia means, first and second indicator means associated with said first and second indicia means respectively for indicating the movement of said sight tube in each of said planes relative to a viewed target, said sight head being operative in two planes offset 90 degrees from each other, and said cooperative indicia and indicating means being operative to indicate the movement of said sight tube in each of the planes of said sight head.

21. In a wheel testing device, a pair of posts, means for attaching said posts relation to the spindles of opposite wheels of a vehicle, a sighting device carried by each post, each sighting device including a target, means mounting each of said posts to an associated attaching means for movement between two normal planes, means for moving each of said sighting devices horizontally and vertically when said posts are in both of said two planes, and means associated with said actuating means for indicating the relative angular relationship of the sighting devices and targets in each of said planes.

22. The wheel testing device as defined in claim 21 wherein said two planes are horizontal and vertical planes.

23. A method of determining the relative alignment of a pair of steerable wheels by means of a sight tube and target device carried by each wheel comprising the steps of sighting through a first of the sight tubes along a first line of sight at the opposite target, manipulating the first sight tube until the first line of sight indicates a zero setting on the opposite target, sighting through a second of the sight tubes along a second line of sight at another opposite target, manipulating the second sight tube until the second line of sight indicates a zero setting on the another opposite target, and determining the angular relationship between the first and second sight lines by the amount of manipulation required to bring the second line of sight to zero setting.

24. A method of determining the relative position of a steerable wheel to a spoke of a steering wheel operatively connected to the steerable wheel by means of a sight tube and target device carried by each wheel comprising the steps of setting the spoke to a straight ahead position, sighting through a first of the sight tubes along a first line of sight at an opposite target, manipulating the first sight tube until the first line of sight indicates a zero setting on the opposite target, sighting through a second of the sight tubes along a second line of sight at another opposite target, manipulating the second sight tube until the second line of sight indicates a zero setting on the another opposite target, and determining the angular relationship between the first and second sight lines by the amount of manipulation required to bring the second line of sight to zero setting.

25. The method as defined in claim 23 wherein said first and second sight lines are taken in one of two planes spaced approximately ninety degrees apart.

26. A wheel aligner comprising a pair of support posts having upper and lower end portions, means at said lower end portion for selectively positioning the wheel aligner relative to an automobile spindle with the posts thereof in both horizontal and vertical planes, viewing means in the form of a sight tube at the upper end portion of each post, means mounting each sight tube for movement in both horizontal and vertical planes, first means responsive to sight tube movement for indicating the amount of movement of each sight tube in a vertical plane in both the horizontal and vertical planes of the support post, and second means responsive to each sight tube movement for indicating the amount of movement of each sight tube in a horizontal plane in both the horizontal and vertical planes of said support post.

27. The wheel aligner as defined in claim 26 wherein said first and second indicating means are each defined by relatively movable indicia means and associated indicator means.

28. The wheel aligner as defined in claim 26 wherein said first and second indicating means are each defined by relatively movable indicia means and associated indicator means, said indicia means being movable and said indicator means being stationary.

29. The wheel aligner as defined in claim 26 including means coupled to said first and second indicating means for moving said sight tube vertically and horizontally in the horizontal and vertical planes of said post, and said indicating means being coupled to associated ones of said moving means thereby determining the amount of movement of said sight tube in both vertical and horizontal planes when said support post is disposed both vertically and horizontally.

30. The wheel aligner as defined in claim 4 wherein said securing means includes a body, a plurality of securing arms pivotally mounted to said body for movement of ends thereof radially inwardly and outwardly relative to an axis of said body, means for securing said arms in any one of selected positions thereof, and said compensating means being movable eccentric means between said securing arms and said body for increasing and decreasing the distance between the ends of said securing arms and a predetermined area of said body thereby compensating for run-out tolerance of a wheel to which the aligner is adapted to be secured.

31. The wheel aligner as defined in claim 30 wherein said eccentric means includes an eccentric member pivotally mounting each securing arm to said body, and manipulatable means carried by each eccentric member for rotating each eccentric member individually to increase or decrease said distance.

32. The wheel aligner as defined in claim 30 including means for preventing the movement of said eccentric means after the securing arms have been secured by said securing means in any one of the positions thereof to prevent a change in established distance between said securing arm and said body area.

References Cited

UNITED STATES PATENTS

| | | | |
|---|---|---|---|
| 1,959,551 | 5/1934 | Schubert | 33—46.2 |
| 2,405,441 | 8/1946 | Martin. | |
| 2,627,123 | 2/1953 | Taber | 33—203.18 |
| 2,689,403 | 2/1954 | Wilkerson. | |
| 2,882,608 | 4/1959 | Tursman | 33—203.18 |
| 3,266,150 | 8/1966 | Mussano. | |

WILLIAM D. MARTIN, JR., *Primary Examiner.*

U.S. Cl. X.R.

33—203.18